(12) United States Patent
Scherer et al.

(10) Patent No.: US 9,332,579 B2
(45) Date of Patent: May 3, 2016

(54) METHOD AND SYSTEM FOR EFFICIENT USE OF A TELECOMMUNICATION NETWORK AND THE CONNECTION BETWEEN THE TELECOMMUNICATIONS NETWORK AND A CUSTOMER PREMISES EQUIPMENT

(75) Inventors: Christoph Scherer, Bensheim (DE); Holger Ebling, Buettelborn/Worfelden (DE)

(73) Assignee: DEUTSCHE TELEKOM AG, Bonn (DE)

( * ) Notice: Subject to any disclaimer, the term of this patent is extended or adjusted under 35 U.S.C. 154(b) by 6 days.

(21) Appl. No.: 13/805,404

(22) PCT Filed: Jun. 21, 2011

(86) PCT No.: PCT/EP2011/003058
§ 371 (c)(1),
(2), (4) Date: Dec. 19, 2012

(87) PCT Pub. No.: WO2011/160813
PCT Pub. Date: Dec. 29, 2011

(65) Prior Publication Data
US 2013/0100913 A1    Apr. 25, 2013

Related U.S. Application Data

(60) Provisional application No. 61/356,786, filed on Jun. 21, 2010.

(30) Foreign Application Priority Data

Jun. 21, 2010  (EP) .................................. 10006410

(51) Int. Cl.
*H04L 12/28* (2006.01)
*H04W 76/02* (2009.01)
(Continued)

(52) U.S. Cl.
CPC ......... *H04W 76/021* (2013.01); *H04L 12/2887* (2013.01); *H04L 29/12028* (2013.01);
(Continued)

(58) Field of Classification Search
USPC .......................... 370/252, 389, 386, 392, 397
See application file for complete search history.

(56) References Cited

U.S. PATENT DOCUMENTS 6,925,076 B1 * 8/2005 Dalgic et al. ................... 370/356
7,280,546 B1 * 10/2007 Sharma et al. ................ 370/401
(Continued)

FOREIGN PATENT DOCUMENTS

CN     101018226 A    8/2007
CN     101102188 A    1/2008
(Continued)

OTHER PUBLICATIONS

Telecommunications and Internet converged Services and Protocols for Advanced Networking (TISPAN); NGN Security; Security Architecture, ETSI Draft; 07038-NGN-R3v320, Jun. 15, 2010 European Telecommunications Standards Institute (ETSI), Sophia-Antipolis ; France, Nr:V3.2.0, pp. 1-64.
(Continued)

*Primary Examiner* — John Pezzlo
(74) *Attorney, Agent, or Firm* — Leydig, Voit & Mayer, Ltd.

(57) ABSTRACT

A method for efficient establishing or configuring a connection between a telecommunications network and a customer premises equipment (CPE) via an access node includes: establishing a physical communication channel between the access; node of the telecommunications network and the CPE; providing a public or private Internet Protocol (IP) address to the CPE for use by the CPE to communicate with an IP Edge node of the telecommunications network; initially assigning a first functionality level to the public or private IP address; and assigning a second functionality level to the public or private IP address, when the telecommunications network is able to federate a network access related identification information to a contract related identification information.

11 Claims, 4 Drawing Sheets

(51) Int. Cl.
*H04L 29/12* (2006.01)
*H04L 29/06* (2006.01)
*H04J 1/16* (2006.01)
*H04W 8/26* (2009.01)

(52) U.S. Cl.
CPC .............. *H04L61/103* (2013.01); *H04L 63/08* (2013.01); *H04L 29/1216* (2013.01); *H04L 61/157* (2013.01); *H04W 8/26* (2013.01); *H04W 76/02* (2013.01)

(56) References Cited

U.S. PATENT DOCUMENTS

| | | | |
|---|---|---|---|
| 2003/0131107 A1* | 7/2003 | Godse et al. | 709/225 |
| 2004/0258003 A1* | 12/2004 | Kokot et al. | 370/254 |
| 2005/0063333 A1* | 3/2005 | Patron et al. | 370/329 |
| 2007/0022469 A1* | 1/2007 | Cooper | H04K 1/00 726/3 |
| 2008/0281699 A1* | 11/2008 | Whitehead | 705/14 |
| 2009/0313007 A1* | 12/2009 | Bajaj et al. | 704/3 |
| 2010/0202441 A1 | 8/2010 | Haag et al. | |

FOREIGN PATENT DOCUMENTS

| | | |
|---|---|---|
| CN | 101123564 A | 2/2008 |
| DE | 102007039516 A1 | 2/2009 |
| JP | 2005276122 A | 10/2005 |
| JP | 2007318552 A | 12/2007 |
| WO | WO 2008061570 A1 * | 5/2008 |

OTHER PUBLICATIONS

Telecommunications and Internet converged Services and Protocols for Advanced Networking (TISPAN); NGN Functional Architecture, ETSI Draft; 17bTD329, 20090209 European Telecommunications Standards Institute (ETSI), Sophia-Antipolis ; France Nr:V3.0.0, pp. 1-35.
Telecommunications and Internet converged Services and Protocols for Advanced Networking (TISPAN); NGN Functional Architecture; Network Attachment Sub-System (NASS), ETSI Standard, Mar. 1, 2010 European Telecommunications Standards Institue (ETSI), Sophia-Antipolis ; France, vol. TISPAN 2, Nr:V3.4.1, pp. 1-52.
Teleommunications and Internet converged Services and Protocols for Advanced Networking (TISPAN); Resource and Admission Control Sub-System (RACS): Functional Architecture, ETSI Standard, Apr. 1, 2010 European Telecommunications Standards Institute (ETSI), Sophia-Antipolis ; France, vol. TISPAN 2, Nr:V3.4.2, pp. 1-182.
Copeland, Rebecca, Converging NGN Wireline and Mobile 3G Networks with IMS: Converging NGN and 3G Mobile—Chapter Network Admission, 20081222 Auerbach Publications 2008—ISBN 978-1-4200-1378-8 ; ISBN 420013787, pp. 117-155.
"3$^{rd}$ Generation Partnership Project: Technical Specification Group Services and System Aspect: 3G security; Access security for IP-based services (release 10)" 3GPP Standard; 3GPP TS 33.203, 3$^{rd}$ Generation Partnership Project, Sophia-Antipolis Cedex, France, No. V10.0.0, Jun. 16, 2010, pp. 1-114.
Garcia, Yolanda, "DSL fernkonfiguriert" Dec. 5, 2007, pp. 1-14.
European Patent Office, International Search Report in International Patent Application No. PCT/EP2011/003058 (Oct. 19, 2011).
European Patent Office, Extended European Search Report in European Patent Application No. 10006410.0 (Dec. 21, 2010).
Telecommunications and Internet converged Services and Protocols for Advanced Networking (TISPN); NGN Functional Architecture, ETSI, ETSI ES 282 001 V3.4.1 (Sep. 2009).
Telecommunications and Internet converged Services and Protocols for Advanced Networking (TISPN); NGN Security; Security Architecture, ETSI, ETSI TS 187 003 V2.1.1 (Feb. 2009).

* cited by examiner

METHOD AND SYSTEM FOR EFFICIENT USE OF A TELECOMMUNICATION NETWORK AND THE CONNECTION BETWEEN THE TELECOMMUNICATIONS NETWORK AND A CUSTOMER PREMISES EQUIPMENT

CROSS-REFERENCE TO RELATED APPLICATIONS

This application is a U.S. National Phase application under 35 U.S.C. §371 of International Application No. PCT/EP2011/003058, filed on Jun. 21, 2011, and claims benefit to European Patent Application No. EP 10006410.4, filed on Jun. 21, 2010, and U.S. Provisional Patent Application No. 61/356,786, filed on Jun. 21, 2010. The International Application was published in English on Dec. 29, 2011 as WO 2011/160813 A1 under PCT Article 21(2).

FIELD

The present invention relates to a method and a system for efficient use of a telecommunication network and the connection between this telecommunications network and a customer premises equipment.

BACKGROUND

From U.S. Pat. No. 7,127,049, a system enhancing automation of activating network service between a customer modem and a central office modem over a digital subscriber line link is known. In the system according to this prior art, the central office modem couples the customer modem to a network for providing the network service, the system comprising a polling system coupled with the central office modems.

Furthermore, TS 33.203 of the third Generation Partnership Project (3GPP), Access security for IP-based services (Release 10), 16 Jun. 2010 discloses a method for establishing a connection between an access node of a telecommunications network and a User Equipment.

Such known systems have a number of drawbacks. For example, due to the polling system defining a certain time period during which no network access is possible for the customer modem. Furthermore, the known system relays on the provisioning of a session assigned Internet Protocol address which cannot be used permanently and therefore necessitates the reconnection of the connection between the customer modem and the communications network (by possibly another Internet Protocol address and thus possibly a disconnection step and/or the initiation of new session and/or a reboot operation of the customers equipment.

Furthermore, according to the prior art, in order to establish the Internet Protocol connection between, on the one hand, the Internet Protocol Edge node and, on the other hand, the User Equipment like a customer modem or a CPE (Customer Premises Equipment), it is always necessary to use—as an authentication information—an information that is used or distributed in an untrusted environment. For example, CPE units are pre-configured in a user-specific manner and distributed to a plurality of customers or the customer hast to configure the CPE with credentials he got from the operator of the telecommunications network. Such pre-configuration information is not inherently secure or trusted because, due to the steps occurring prior to the establishment of an Internet Protocol session according to the prior art, the telecommunications network operator necessarily needs to distribute such credentials or pre-configuration or other (previously trusted) information in an untrusted environment or to an untrusted environment (e.g. customers household).

These limitations have the effect that the connection between the customer modem on the one hand and the telecommunications network on the other hand is comparably time consuming. The user has to type in credentials to access the network. There is no plug and play solution to access the network and services provided to the network connectivity.

Furthermore, German patent publication DE 10 2007 039 516 A1 discloses a method for configuring a communication port in a user-specific manner, the method comprising the step of providing a default profile, the default profile being directed to a specific user, and the method further comprising the step of assigning the user-specific default profile to a user-specific configuration profile, the user-specific configuration profile being assigned to a specific user.

SUMMARY

In an embodiment, the present invention provides a method for efficient establishing or configuring a connection between a telecommunications network and a customer premises equipment (CPE) via an access node. The method includes: establishing a physical communication channel between the access node of the telecommunications network and the CPE, the physical communication channel being assigned to a network access related identification information related to the access node; providing, by the telecommunications network, a public or private Internet Protocol (IP) address to the CPE for use by the CPE to communicate with an IP Edge node of the telecommunications network, the IP address being associated with the network access related identification information and an IP session or connection realizing a logical communication channel being initiated between the IP Edge node of the telecommunications network and the CPE; initially assigning, by the telecommunications network, a first functionality level to the public or private IP address; and assigning, by the telecommunications network, a second functionality level to the public or private IP address, when the telecommunications network is able to federate the network access related identification information to a contract related identification information, the federation of the network access related identification information to the contract related identification information comprising an authentication based on a Network Attachment Subsystem (NASS).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
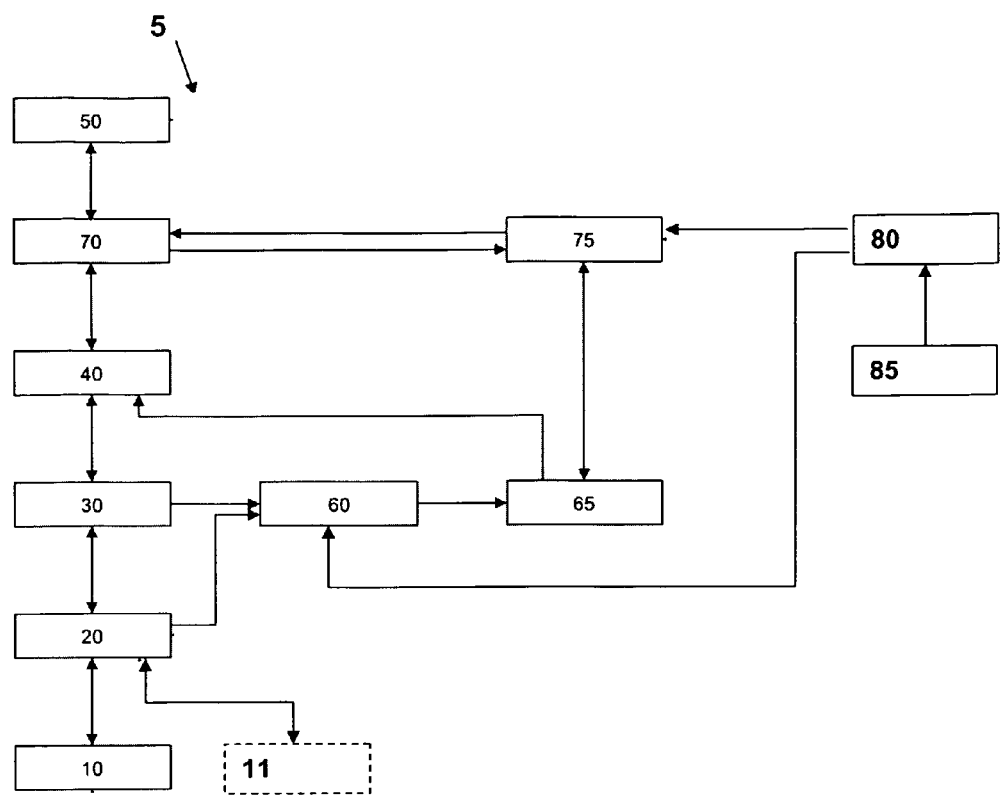
FIG. 1 illustrates schematically an example of a telecommunications network with a connected CPE.

Embodiments of the present invention provide a system and a method for efficient use of a telecommunications network and the connection between this telecommunications network and a customer premises equipment (CPE) by means of providing a communication channel between the telecommunications network and a CPE and by providing a control of the telecommunications network such that
 a flexible usage of telecommunications services is possible to the user,
 requiring only a minimum of time delay for configuring the telecommunications service without the necessity to configure the CPE itself,
 providing the possibility to effectively and securely execute an authentication process for the access to the telecommunications network, and
 a high or higher security level is achieved than by methods according to the prior art.
The present invention further provides a system such that managing the authorization of the IP connectivity to connect to several telecommunication services is independent from the IP connectivity itself.

In an embodiment, the present invention provides a method for efficient use of a telecommunications network and the connection between the telecommunications network and a Customer Premises Equipment (CPE), via an access node, the method comprising the steps of:
 establishing a physical communication channel between the access node of the telecommunications network and the CPE, the physical communication channel being assigned to a network access related identification information related to the access node,
 the telecommunications network providing a public or private Internet Protocol address to the CPE for use by the CPE to communicate with an Internet Protocol Edge node of the telecommunications network, the Internet Protocol address being associated with the network access related identification information and an Internet Protocol session (IP session) or connection realizing a logical communication channel being initiated between the Internet Protocol Edge node of the telecommunications network and the CPE,
 the telecommunications network initially assigning a first functionality level to the public or private Internet Protocol address (e.g. in the form of a walled garden),
 the telecommunications network assigning a second functionality level to the Internet Protocol address, in case that the telecommunications network is able to federate the network access related identification information to a contract related identification information,
 the federation of the network access related identification information to the contract related identification information comprising an authentication based on a Network Attachment Subsystem (NASS).

In an embodiment, the present invention provides a method for efficient use of a telecommunications network and the connection between an access node of a telecommunications network and a CPE, the method comprising the steps of:
 establishing a physical communication channel between the access node of the telecommunications network and the CPE, the physical communication channel being assigned to a network access related identification information,
 the telecommunications network providing a public or private Internet Protocol address to the CPE for use by the CPE to communicate with the IP network of the telecommunications network, the Internet Protocol address being associated with the network access related identification information,
 the telecommunications network initially assigning a first functionality level to the public or private Internet Protocol address (e.g. in the form of a walled garden),
 the telecommunications network assigning a second functionality level to the Internet Protocol address, in case that the telecommunications network is able to federate the network access related identification information to a contract related identification information,
 the federation of the network access related identification information to the contract related identification information comprising an authentication based on a Network Attachment Subsystem (NASS).

According to the present invention, it is preferred that the logical communication channel is established by using at least one piece of authentication information, the at least one piece of authentication information being a trusted information existing within the telecommunications network.

The physical communication link between the access node of the telecommunications network and the CPE can be any wireline communication link. Such a wireline communication link usually comprises an end connected to the CPE and an end connected to the access node of the telecommunications network. The access node according to the present invention is defined as any device terminating the access network, that is part of the telecommunications network, and the home network. The CPE is to be understood as a customer premises equipment like a home gateway having a router functionality or any other device capable to establish an IP connectivity and being connected to the physical communication link, e.g., by means of being linked (or plugged) to a transfer point or a building entrance interface. The physical communication link between the access node and the CPE is also often referred to as the "last mile" (between the network components of the access network and the customer premises equipment. It is to be understood that the term "physical communication link between the access node of the telecommunications network and the CPE" does not need to be an individual wireline communication link between the CPE and the access node but can also be realized by means of an active device (e.g. ONU/ONT or Cable Modem) the CPE is connected if a shared medium is used such as an optical fiber network based on GPON, a cable network or the like. In the context of the present invention, the term "physical communication link" also includes a "logical communication link" between the two points to be connected. Even a (partial) use of a wireless communication link such as a point-to-point radio system (or directional radio link) between the access node of the telecommunications network and the CPE is to be understood as being a "physical communication link" in the sense that such a physical communication link comprises an end connected to the CPE and an end connected to the access node of the telecommunications network.

Examples of a wireline communication link include a digital subscriber line communication link via a pair of copper lines or a digital subscriber line communication link via an optical fiber link or a digital subscriber line communication link via a cable television access link. In case a digital subscriber line communication link via a pair of copper lines is used, the CPE is, e.g., linked to the telecommunications network by means of a so-called TAE (Telekommunikations Anschluss Einheit), APL (Abschlusspunkt Linientechnik, access point line technology or transfer point) and the pair of copper lines runs between the TAE/APL (in the subscribers home) to a Digital Subscriber Line Access Multiplexer (DSLAM) serving as access node of the telecommunications network. In case a digital subscriber line communication link via an optical fiber link is used, the CPE is, e.g., linked to the telecommunications network by means of a so-called ONU (Optical Network Unit) or ONT (Optical Network Termination) and the optical fiber link runs between the ONU/ONT (in the subscribers home) to an OLT (Optical Line Terminal) serving as access node of the telecommunications network. In case a digital subscriber line communication link via cable television access link is used, the CPE is, e.g., linked to the telecommunications network by means of a so-called CM (Cable Modem) and the cable television access link runs between the CM (in the subscribers home) to an CMTS (Cable Modem Terminal System) serving as access node of the telecommunications network.

According to the present invention, the logical communication channel is established between the Internet Protocol Edge node and the CPE. The logical communication channel corresponds to an Internet Protocol session or connection. The physical communication channel (between the telecommunications network and the CPE) is established between the access node and the CPE. It is possible and preferred according to all embodiments of the present invention that the functionality of the Internet Protocol Edge node is at least partly integrated into the network node having the functionality of the access node or vice versa (i.e. that the functionality of the access node is at least partly integrated into the network node having the functionality of the Internet Protocol Edge node).

According to the present invention, the logical communication channel between the Internet Protocol Edge node and the CPE (the Internet Protocol connection) is established by using at least one piece of authentication information, the at least one piece of authentication information being a trusted information existing within the telecommunications network, especially on the access node or access node port where the CPE is physically connected to. This means in the context of the present invention that, in order to establish a completely functional Internet Protocol session or connection (i.e. the logical communication channel between the Internet Protocol Edge node and the CPE), no distribution of credentials or personalized pre-configured CPE devices are necessary. It is only necessary that the telecommunications network, i.e. a control unit or a control function, knows about the existence of a specific port of the access node (and Line ID) and that a CPE, i.e. an arbitrarily configured CPE, is connected physically to the specific port of the access node. Based on these technical conditions, an Internet Protocol session or connection is possible to be established for the CPE. According to the present invention, initially, this Internet Protocol connectivity or Internet Protocol session (i.e. the logical communication channel) is preferably only functional based on the first functionality level. Upon exchanging the contract related information, the activation of the second functionality level is possible.

According to a preferred embodiment of the present invention, the at least one piece of authentication information is independent from the CPE, and the at least one piece of authentication information is related solely to either the access node or to other parts of the telecommunications network.

Thereby, it is advantageously possible to reduce the logistical effort for distributing the CPE devices to customers, for pre-configuring of CPE devices or handling the at least one piece of authentication information, i.e. especially credentials or credential information, as prerequisite for an Internet Protocol session or connection.

According to a preferred embodiment of the present invention, the network access related identification information corresponds to or is a so-called port ID and/or a line ID. The network access related identification information or the line ID represents the physical communication channel. The physical communication channel is necessarily located, i.e. leads from a specific access node to a specific transfer point (or vice versa), and therefore allows for the possibility to assign to the physical communication channel not only its identity (network access related identification information) but also its location, e.g. in the form of an postal address or in the form of specifying a specific apartment inside an apartment building. The location of the physical communication channel preferably relates primarily to its remote end (i.e. the customer premise or the starting point of the physical communication link between the CPE and the access node). A so-called network port identification information, hereinafter also called port ID identifies the port of the access node which is connected to the physical connection towards the CPE. It is possible according to the present invention to associate a line ID (i.e. the network access related identification information) to the port of an access node, so both identifiers can be transported within technical protocols in the telecommunication network.

After an initial request of the CPE to the access node for requesting a telecommunications network service (i.e. for establishing a data transmission connection), the access node complements the request of the CPE by the information elements of the line ID and of the port ID. This is preferably done via the DHCP protocol (Dynamic Host Configuration Protocol), preferably using DHCP option 82 or PPPoE (Point-to-Point Protocol over Ethernet), preferable using PPPoE intermediate agent.

The telecommunications network preferably comprises a so-called Internet Protocol Edge node. The Internet Protocol Edge node administers the distribution of Internet Protocol addresses towards the CPE as well as different functionality levels associated with different Internet Protocol addresses the CPE can address. Hence, the Internet Protocol Edge node can be understood as being a routing device having a plurality of access and permission rules associated with different Internet Protocol addresses on different virtual interfaces. An Internet Protocol address given to the CPE having a reduced functionality level, e.g., is only permitted to a limited access range of target Internet Protocol addresses. An Internet Protocol address having an increased functionality level, e.g., is permitted to an enhanced access range of target Internet Protocol addresses with a default route to the internet.

According to the present invention, there are a number of different functionality levels that can be associated or assigned to an Internet Protocol address given to the CPE:
A reduced functionality level is available to any functional physical communication channel between any port of an access node of the telecommunications network and any associated CPE operational with this kind of access node. Such a reduced functionality level is used according to the present invention to provide a basic connectivity with no relationship to a contract to enable the user behind this connectivity to use a default set of functionalities, e.g., a possibility to choose different access modes and/or different services offered by the operator of such services by accessing a customer self care interface.

An enhanced functionality level is associated with any service that can be delivered and is accessible by the physical communication channel especially by means of an Internet Protocol based network connection. Such services include but are not limited to an internet access service, a VoIP (voice over Internet Protocol) service, a VoD (video on demand) service, a television (TV) service or the like.

It is possible and preferred according to the present invention that a plurality of enhanced functionality levels exist, e.g. an enhanced functionality level with regard to internet access service can be provided simultaneously with a reduced functionality level regarding a multicast service such as television service (IPTV) or VoD.

According to one embodiment of the present invention, the initialization process of an Internet Protocol based service is described which means that the "first functionality level" refers to a reduced functionality level, especially the basic connectivity level, and that the "second functionality level" refers to an enhanced functionality associated with a certain kind of service delivery by the service provider after a reference to a contract related identification information (i.e. for example an authorization information) is made derived from a contract or at least to a possible contract (in the future). This process is called "federation" in the context of the present invention. According to this embodiment, the first functionality level referring to such a reduced functionality level in the sense of a basic connectivity level for example only allows an entity accessing the network to be connected to a customer self care interface or another service or functionality aimed at configuring the network access. Such a reduced or basic connectivity level is also called "walled garden" in the context of the present invention. According to another embodiment of the present invention, a change in the Internet Protocol based service configuration is described which means that the "first functionality level" refers to a functionality level prior to the change of service configuration and that the "second functionality level" refers to a functionality level after the change of service configuration. For example, the functionality level prior to the change of service configuration might include only VoIP or a functionality implementing services previously provided by the POTS system, and the functionality level after the change of service configuration might include VoIP or POTS functionality as well as internet access functionality (or the functionality level after the change of service configuration might include VoIP or POTS functionality as well as both internet access functionality and TV or VoD functionality.

According to another example, the functionality level prior to the change of service configuration might include VoIP or POTS functionality as well as access to a walled garden and the functionality level after the change of service configuration might include VoIP or POTS functionality as well as internet access functionality.

According to a preferred embodiment of the present invention, the telecommunications network comprises an Internet Protocol Edge node and a control function, wherein the contract related identification information to enable the second functionality level is sent to the control function after relating the network access related identification information to the contract related identification information by the federation process. In the control function, a set of authorization information is stored. Initially this set of authorization information in the meaning of "first functionality level" is a basic set of rights not derived from a contract. In a second step this authorization information in the meaning of "second functionality level" is changed. This is preferably done

- after relating a line ID (i.e. a network access related identification information) to a contract related identification information, e.g. an entity like a user holding the authorization information for services derived from a contract (federation), or
- after changing the authorization information related to this user by changing the existent contract or changing it because of other reasons (e.g. blocking the service because of abusive behavior).

In the context of the present invention, the term "contract related identification information" is related to an information that is

- either linked to an authorization information for services like internet service and/or a VoD service and/or a telephone (VoIP) service and/or a television over IP service) and/or other internet provider services like e-mail or portal services;
- or linked to an authorization information derived from a pre-paid contract related to a specific service a user has with the service provider;
- or linked to an authorization information derived from another contractual or quasi-contractual relationship with the service provider such as a promotional offer, a voucher or the like.

According to the present invention, the federation of the network access related identification information to the contract related identification information comprises an authentication based on a Network Attachment Subsystem (NASS). This means that an authentication process is executed such that the user requesting access to the telecommunications network can be provided such an access by authenticating the network access related identification information and resolving the federated contract related identification information like the user itself.

According to a preferred embodiment of the present invention, the authentication based on a Network Attachment Subsystem (NASS) comprises any application like a portal login or a SMTP authentication dialog, especially a SIP (Session initiation Protocol) registration.

According to another preferred embodiment of the present invention, the assignment of the second functionality level to the public or private Internet Protocol address is effected within 100 seconds from assigning the line ID and the entity holding the authorization information, preferably within 30 seconds, more preferably within 10 seconds, still more preferably within 3 seconds and most preferably within 1 second.

Thereby, it is advantageously possible to almost immediately configure the network parameters such that a modification of the service settings of a user can be used.

According to the present invention, it is furthermore preferred that a token information or a Uniform Resource Identifier (URI) linked to a token information is used during the authentication process. This URI to a token or the token information itself is issued within the process of providing an IP address to the CPE.

Thereby, it is advantageously possible according to the present invention to ensure that the authentication process can be executed in a secure manner.

According to the present invention, it is preferred that the differentiation between different functionality levels is realized by the Internet Protocol Edge node by defining different ranges of Internet Protocol addresses that are potentially accessible by the CPE as well as other filters (e.g. Layer4). For content information that is not routed via the Internet Protocol Edge node, it is preferred according to the present invention that the Internet Protocol Edge node controls the associated telecommunications network elements (such as the access node) in order to allow or deny the access to such content information for a specified CPE like enabling or disabling the transport of multicast or even allow or deny the transport of a special kind of Ethernet frames.

According to the present invention, it is preferred that such a control of the associated telecommunications network elements (such as the access node) is realized via DHCP (dynamic host configuration protocol) or a DHCP based protocol or PPPoE (point to point over Ethernet).

According to the present invention, it is preferred that the Internet Protocol Edge node communicates with a control function of the telecommunications network in order to obtain authorization information. The authorization information is used by the Internet Protocol Edge node to associate a specific functionality level to the public or private Internet Protocol address provided to the CPE. The request of the authorization information is preferably based on the line ID as network access related identification information. According to the present invention, the control function is realized by means of a centralized authentication, authorization, and accounting (AAA) function or an associated AAA node. The authentication and/or authorization function associated with the control function is realized, e.g., by means of a RADIUS (Remote Authentication Dial In User Service (RADIUS)) server node or by means of a DIAMETER server node (or by means of a corresponding function realizing a RADIUS functionality). The control function provides information to the Internet Protocol Edge node that is related to the functionality level of the Internet Protocol address. This means that a memory means is assigned to the control function (or a control node comprises the memory means) such that the network access related identification information (e.g. the line ID) is associated to information relating to the specific functionality level associated to a certain contractual relationship of a user or to the person of a certain user. The information relating to the functionality level comprises, e.g., information regarding the potentially addressable range of Internet Protocol addresses and the allowed and/or usable bandwidth. Such information relating to the functionality level might be stored in the memory device associated with the control function in the form of so-called policies and/or in the form of dedicated single information and are used for the authorization of a request received by the control function from the Internet Protocol Edge node.

According to the present invention, it is preferred that the control function is able to force the Internet Protocol Edge node to implement changes in the functionality level even for a working connection having a working IP address. For example, this can be realized by means of a change of authorization request. According to the present invention, it is preferred that such a change in the functionality level (associated with a working connection of the CPE with the telecommunications network using the Internet Protocol address initially provided) is realized by means of a communication between the control function and the Internet Protocol Edge node. For example, the Internet Protocol Edge node acknowledges a command to restrict or expand the functionality level by means of an "Accounting Stop" message (in case an Internet Protocol connectivity already exists between the CPE and the Internet Protocol Edge) and a subsequent "Accounting Start" message towards the control function. This is preferable done without interrupting the Internet Protocol connectivity of the CPE.

According to the present invention, it is preferred that the initial provisioning of an Internet Protocol address for the connectivity of the CPE towards the telecommunications network (i.e. between the CPE and the access node) is realized by the Internet Protocol Edge node or by the control function.

According to the present invention, it is further preferred that the control function is able to return the following pieces of information related to a working Internet Protocol connectivity (or working Internet Protocol session):
  line ID and port ID for each kind of communication link,
  range of Internet Protocol addresses addressable by the CPE,
  network parameter related to an Internet Protocol session
  network parameter related to the physical attachment between the CPE and the access node like e.g. the sync bandwidth of a DSL subscriber line.

Alternatively, it is possible and preferred according to the present invention that instead of the line ID, a handle reference or a pointer reference is used. In case that the line ID is federated to a contract related identification information, an application IDP (application identity provider) referenced with the handle reference or pointer reference. This enhances data privacy if network and service operators (holding the contract for the IP services) are different legal entities. Especially in such a case (that network and service operators (holding the contract for the IP services) are different legal entities), it is preferred according to the present invention that the reference handle associated to the contract related identification information is a so-called opaque handle, i.e. an encrypted or otherwise masked information such that the content of the line ID cannot easily be derived from the opaque handle or encrypted or otherwise masked information.

According to the present invention, it is further preferred that the control function is able to establish an IP connectivity even no line ID is provided for authentication (e.g. in case of maintenance situations or the like). In this case, a special authorization profile (i.e. the configuration and installation functionality level) has to be provided to the IP edge for basic communication between a user or a technician and the operator of the telecommunication network.

The present invention also relates to a telecommunications network comprising a plurality of network nodes, the telecommunications network being provided for efficient connection between the telecommunications network and a CPE, via an access node, wherein the telecommunications network comprises a physical communication channel between the access node of the telecommunications network and the CPE, the physical communication link being associated to a network access related identification information related to the access node, wherein the telecommunications network provides a public or private Internet Protocol address to the CPE for use by the CPE to communicate with the Internet Protocol Edge node, the Internet Protocol address being associated with the network access related identification information and an Internet Protocol session (IP session) or connection realizing a logical communication channel being initiated between the Internet Protocol Edge node of the telecommunications network and the CPE, wherein the telecommunications network initially assigns a first functionality level to the public or private Internet Protocol address, and wherein the telecommunications network assigns a second functionality level to the public or private Internet Protocol address, in case that the telecommunications network is able to federate the network access related identification information to a contract related identification information, wherein the federation of the network access related identification information to the contract related identification information comprises an authentication based on a Network Attachment Subsystem (NASS) which is represented by the control function of the telecommunications network.

The present invention furthermore also relates to a telecommunications network comprising a plurality of network nodes, the telecommunications network being provided for efficient connection between the telecommunications network and a CPE, via an access node, wherein the telecommunications network comprises a physical communication channel between the access node of the telecommunications network and the CPE, the physical communication link being associated to a network access related identification information related to the access node, wherein the telecommunications network provides a public or private Internet Protocol address to the CPE for use by the CPE to communicate with the Internet Protocol Edge node, the Internet Protocol address being associated with the network access related identification information and an Internet Protocol session (IP session) or connection realizing a logical communication channel being initiated between the Internet Protocol Edge node of the telecommunications network and the CPE, wherein the telecommunications network initially assigns a first functionality level to the public or private Internet Protocol address, and wherein the telecommunications network assigns a second functionality level to the public or private Internet Protocol address, in case that the telecommunications network is able to federate the network access related identification information to a contract related identification information, wherein the federation of the network access related identification information to the contract related identification information comprises an authentication based on a Network Attachment Subsystem (NASS).

According to the present invention, it is preferred that the logical communication channel is established by using at least one piece of authentication information, the at least one piece of authentication information being a trusted information existing within the telecommunications network.

Further subjects of the present invention include a program comprising a computer readable program code for controlling an access node and/or a control function to perform an inventive method and a computer program product comprising such a program.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, an example of a telecommunications network 5 with a connected customer is schematically represented. The customer is connected to the telecommunications network 5 using a so-called CPE or a dedicated CPE with capabilities to establish an IP connectivity like a PC, a settop box or any other device 10. The CPE 10 is, e.g., a routing device installed in the user's home. Further customer premises equipment (CPE) might be present connected to the CPE.

The CPE 10 is connected to the telecommunications network 5 via an access node 20. The access node 20 is preferably a Digital Subscriber Line Access Multiplexer (DSLAM) installed either in the building of the customer or installed at a distance of less than a few kilometers, preferably less than 1000 meters, more preferably less than 500 meters or an OLT (Optical Line Terminal) serving as access node of the telecommunications network.

The access node 20 is connected to an Internet Protocol Edge node 30 within the telecommunications network 5. The Internet Protocol Edge node administers the distribution of Internet Protocol addresses as well as different functionality levels associated with different Internet Protocol addresses, the CPE can access. The Internet Protocol Edge node can be understood as being a routing device having a plurality of access and permission rules regarding different Internet Protocol addresses on different virtual interfaces. Especially, the Internet Protocol Edge node 30 controls which addresses and functions are accessible by the CPE 10 on Layer 3 and Layer 4 of the OSI-Model.

The telecommunications network 5 further comprises a control function 40. According to the present invention, the control function 40 is realized by means of a centralized authentication, authorization, and accounting (AAA) function or an associated AAA node. The authentication and/or authorization functions associated with the control function 40 is realized, e.g., by means of a RADIUS (Remote Authentication Dial In User Service (RADIUS)) server node or by means of a DIAMETER server node (or by means of a corresponding function realizing a RADIUS functionality). According to the present invention, it is possible and preferred that—instead of the Internet Protocol Edge node 30—the control function 40 administers the distribution of Internet Protocol addresses as well as different functionality levels associated with different Internet Protocol addresses, the CPE can access.

The Internet Protocol Edge node 30 furthermore controls the session-accounting for the control function 40. Additionally, the Internet Protocol Edge node 30 is able to use an identifier information or a credential information, obtained or received from the access node 20, for authentication purposes with the control function 40. For authentication purposes, i.e. as a piece of authentication information, the line ID is used. Furthermore, the Internet Protocol Edge node 30 transmits the port ID from the access node 20. The Internet Protocol Edge node 30 furthermore controls the bandwidth (on an Internet Protocol level) for the upstream and downstream dataflow for one or more defined data classes.

According to a preferred embodiment according to the present invention, the Internet Protocol Edge node 30 manages or allocates the Internet Protocol addresses (IP-addresses) of the CPE 10 according to rules or rule information received by the control function 40 (especially received by the Internet Protocol Edge node 30 in return to an access request message to the control function 40).

The telecommunications network 5 further comprises an operation support system 60. The operation support system 60 is especially used to manage the different entities of the access network, i.e. the part of the telecommunications network 5 used to provide access to a comparably important number of users to the telecommunications network 5. Furthermore, the telecommunications network 5 comprises a network identity provider (hereinafter also called network IDP) 65. The network IDP 65 is especially used to handle managing of authentication and authorization for the different ports of one or a plurality of access nodes 20 out of the plurality of access nodes 20 of the telecommunications network 5. The operation support system 60 is linked to the access node 20 such as to be able to initialize the access node 20. The operation support system 60 provides a management connection to the access node 20, preferably by means of an Internet Protocol (IP) connection. This is, e.g., done by using a management address such as an Internet Protocol (IP) address which is specifically reserved for managing or initializing a specific access node 20.

The telecommunications network 5 further comprises an A&A function (authorization and authentication function) 70 for applications and/or an IMS functionality. The A&A function 70 is especially used to authenticate (i.e. the process where an entity's identity is authenticated, typically by providing evidence that it holds a specific digital identity such as an identifier and the corresponding credentials) and to authorize (i.e. whether a particular entity is authorized to perform a given activity) users and/or devices within the telecommunications network 5 towards an application and/or IMS.

Furthermore, the telecommunications network 5 comprises an application identity provider (hereinafter also called application IDP) 75. The application IDP 75 is especially used to handle the different users and/or devices of the telecommunications network 5. The application IDP 75 and the network IDP 65 are able to federate the contract related identification information (hereinafter also called a user identity or user ID) with the network access related identification information, i.e. the identity of a network termination location or a network port (e.g. the port of an access node) by means of a federation interface.

The telecommunications network 5 further comprises an application function or application entity 50 (especially an application of the Internet Protocol Multimedia Subsystem (IMS) system of the telecommunications network 5—especially a SIP proxy (P-CSCF)).

According to the present invention, the telecommunications network 5 preferably comprises a Customer Relation Management function 80 or a corresponding unit. Hereinafter, the term Customer Relation Management function 80 is used to refer to such a unit as well. The Customer Relation Management function 80 is provided as a function to create customer identities (for handling new customers) and corresponding contracts. The Customer Relation Management function 80 is the master of customer, product and contract data. The Customer Relation Management function 80 comprises or is assigned to a request or order management component (or order management function) like in the meaning of "Order Handling" and "Service Configuration and Activation" shown in the eTom model (not explicitly shown) that processes the different requests (e.g. related to the generation of a new customer data element or a fulfillment process) and forwards corresponding requests to other parts of the telecommunications network 5.

According to the present invention, it is furthermore preferred that the telecommunications network 5 also comprises a customer self care interface 85 or a customer self care portal 85. The customer self care portal 85 provides the possibility to a user (or customer) of the telecommunications network 5 to configure the network access.

According to the present invention, a configuration device 11 can be connected to the access node 20 for configuration and/or installation purposes. In normal operative use of the telecommunications network 5, the configuration device 11 is not connected to (all of) the access nodes 20.

Preferably, the customer self care portal 85 supports a user authentication against the application IDP and determines—as a prerequisite for a federation—the line ID that corresponds to the Internet Protocol address used during the authentication process against the control function 40. Preferably, it is possible that the federation process between a user ID and a line ID is also initiated:
  by means of transmitting an order ID to the application IDP, the order ID being related to a user ID, and/or
  by means of transmitting an order ID to the network IDP, the order ID being related to a line ID.

Furthermore, a provisioning interface is preferably provided from the application IDP to the network IDP such that an update of the services accessible to a line ID (i.e. the functionality level associated to the IP address, e.g., assigned to a network port or to a CPE 10 or any other device connected to the access node 20) can be changed by means of the line ID or by means of a handle (preferably an opaque handle) to the line ID. According to the present invention, also a (complete or partial) de-federation between a user ID and a line ID (which results to i.e. a removal of the right to use a specific service or the reduction of rights or usable bandwidth) is possible, preferably by means of the customer self care portal. In the following, only the case of a federation is explicitly mentioned but the de-federation case is also possible according to the present invention.

The execution of the federation process necessitates a user ID and a line ID or any other contract related information. According to a first alternative of the federation process, an explicit user authentication (i.e. a determination of the user ID) is performed with the customer self care portal. By using a network resource to contact the customer self care portal, i.e. by using a network port of an access node 20, also the line ID is available when such a user authentication with the customer self care portal is performed. According to a second alternative of the federation process, the line ID is determined via a location search. Another search also provides a user ID (e.g. after asking the customer for his user name or any other known information assigned to the user ID like a special secret) or any other contract related information. Both the first and the second alternative of the federation process leads to the possibility to federate the user ID or any other contract related information and the line ID. The federation process as well as each later change relating to the services associated to a user ID or any other contract related information results in a request of the application IDP 75 to the network IDP 65. Thereby, the application IDP 75 uses preferably the line ID federated to the user ID or any other contract related information or a corresponding handle. As a result, the network IDP 65 performs an update of the stored data in (or associated with) the control function 40, namely:
  an update of the permissions stored in a persistent database relating to the line ID,
  an update of the permissions stored in a session database relating to an existing Internet Protocol connection, e.g. by means of a change-of-authorization request to the Internet Protocol Edge node 30.

As a result of the federation process, line ID and user ID or any other contract related information are federated, the network IDP 65 and the control function 40 comprise an authorization information for each line ID related to the permitted network services (such as addressable Internet Protocol address ranges and usable bandwidth including the possibility to access a multicast replication point). The possibly existent Internet Protocol connection of a CPE 10 with an Internet Protocol Edge node 30 is re-parameterized. According to the present invention, it is preferably advantageous that it is possible to federate a user ID or any other contract related information with a line ID both by means of a 1 to 1 relationship and by means of a 1 to n relationship. This means that one and the same user can have network service access on a plurality of different line IDs.

Figure 2:
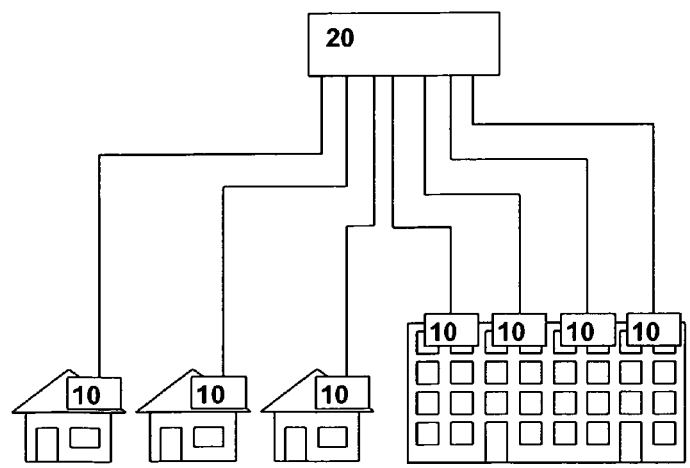
FIG. 2 illustrates schematically an example of a more detailed representation of physical communication channels between an access node and a plurality of home gateways.

In FIG. 2, an example of a more detailed representation of physical communication channels between an access node 20 and a plurality of home gateways 10 is schematically shown. As can be seen from the representation in FIG. 2, an access node 20 be (and preferably is) connected to a plurality of different home gateways 10, e.g. located in different homes. On the left hand side of FIG. 2, a plurality of individual houses are schematically represented. In each of these houses a home gateway 10 is located providing individual access to the telecommunications network 5. On the right hand side of FIG. 2, an apartment building is schematically represented having a plurality of different apartments and each apartment having a home gateway 10 providing individual access to the telecommunications network 5. The different lines running from the access node 20 to the home gateways 10 (of the houses or of the apartment building)

According to the present invention, the telecommunications network 5 is preferably provided as a so-called NGN (next generation network). Generally, NGN telecommunications networks 5 comprise four different planes or network layers, namely a first network plane 1 assigned to the access (access plane 1), a second network plane 2 assigned to the transport of data (transport plane 2), a third network plane 3 assigned to controlling (control plane 3), and a fourth network plane 4 assigned to the applications (application plane 4).

Figure 3:
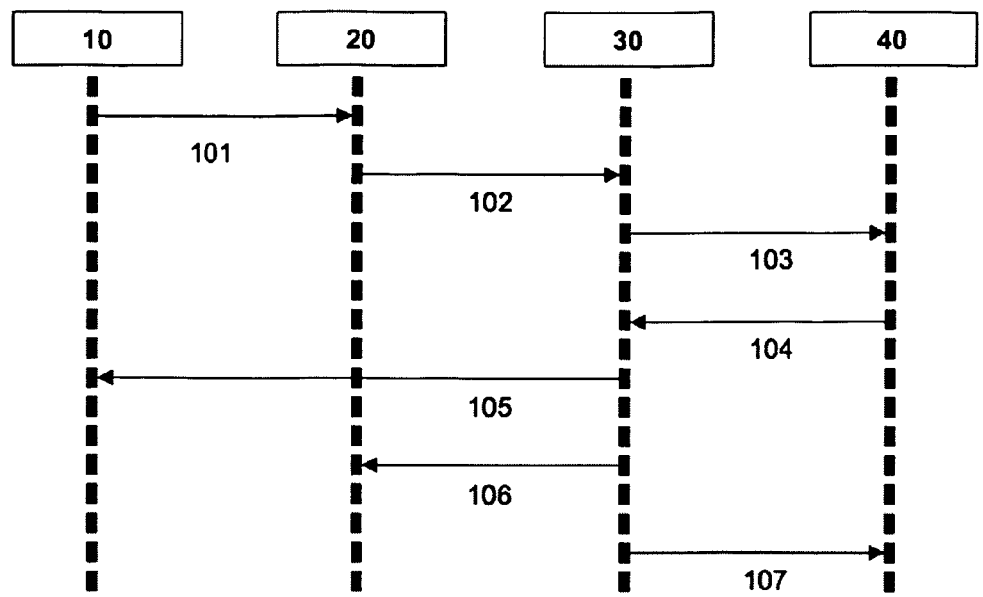
FIG. 3 illustrates schematically a communication diagram related to providing Internet Protocol connectivity to a CPE and initializing a communication service.

In FIG. 3, a communication diagram related to providing Internet Protocol connectivity to a CPE 10 and initializing a communication service is schematically illustrated by means of a multitude of different messages exchanged between the CPE 10, the access node 20, the Internet Protocol Edge node 30 and the control function 40.

In a first step of initially providing Internet Protocol connectivity to the CPE 10, the CPE 10 requests the provision of an Internet Protocol address to the access node 20. This is represented by a first message 101.

In a second step, the access node 20 adds further information to the request to provide an Internet Protocol address. The request with the added information is transmitted to the Internet Protocol Edge node 30. The added further information especially includes line ID and port ID information for the case of a wireline physical communication channel (this constitutes the trusted information according to the present invention as this information (line ID and port ID) is known in a trusted manner to the telecommunications network 5). Besides the network access related identification information (or line ID), further information regarding especially network parameters can be added by the access node like physical connection speed for up- and downstream 20. This is represented by a second message 102.

In a third step, the Internet Protocol Edge node 30 sends an authorization request to the control function 40 based especially on the line ID. This is represented by a third message 103.

In a fourth step, the control function 40 retrieves or determines the authorization information related to the line ID in the request 103. The authorization information especially comprises information regarding
    ranges of Internet Protocol address that should be accessible to the CPE 10 as well as other filters (e.g. Layer4) including accessibility to multicast, and
    bandwidth information regarding allowed or authorized bandwidths (e.g. regarding the upload bandwidth and/or regarding the download bandwidth).

The retrieved or determined authorization information is returned by the control function 40 to the Internet Protocol Edge node 30 which is represented by a fourth message 104. In case that the provisioning of the Internet Protocol address assigned to the CPE is done by the Internet Protocol Edge node, the fourth message 104 does not comprise an indication about the Internet Protocol address assigned to the CPE 10. Alternatively, in case that the provisioning of the Internet Protocol address assigned to the CPE 10 is not done by the Internet Protocol Edge node, the provisioning of the Internet Protocol address to be used by the CPE is provided by the control function, and the fourth message 104 comprises an indication about the Internet Protocol address assigned to the CPE 10.

In a fifth step, the Internet Protocol Edge node provides for a realization of the Internet Protocol traffic routing according to the information received by the control function 40. Especially, the Internet Protocol Edge node sets the ranges of Internet Protocol addresses accessible to the CPE as well as other filters (e.g. Layer4) and the respective usable bandwidths in accordance with the information of the fourth message 104. Furthermore, by means of a fifth message 105, the Internet Protocol Edge node 30 provides an Internet Protocol address (to be assigned to the CPE 10 or to be used by the CPE 10) to the CPE 10. It is preferred according to the present invention, that the fifth message 105 also comprises additional network information such as the default gateway and/or the DNS-address (address of the domain name system, DNS).

In case that setting information contained in the fourth message 104 indicate that modifications regarding the settings of multicast replication parameters (usually done at the access node 20) are necessary, the Internet Protocol Edge node 30 provides such information to the access node by means of a sixth message 106.

In a seventh step, the Internet Protocol Edge node 30 sends a seventh message 107 to the control function 40. The seventh message 107 comprises an Accounting-Start-Request related to the Internet Protocol address to start a session at the control function 40.

In an eighth step, the control function 40 starts a session related to the Internet Protocol address and stores the Internet Protocol address assigned to the CPE, the ranges of Internet Protocol addresses accessible by the CPE as well as other filters (e.g. Layer4) or its correlated authorization information, line ID and port ID, as well as the network parameters describing the access node port capabilities.

As a result, an Internet Protocol connectivity is established between the CPE 10 and the telecommunications network: the CPE 10 is equipped with an Internet Protocol address, i.e. an IP address, (dynamic or static) and all mandatory information are present at the CPE 10 in order to address arbitrary Internet Protocol addresses (if allowed by the purchased service or functionality level) and to dissolve host names to Internet Protocol addresses.

According to the present invention, it is advantageously possible to use a CPE device without comprising personalized credential information (i.e. information directly linked to a specific user or contract).

Figure 4:
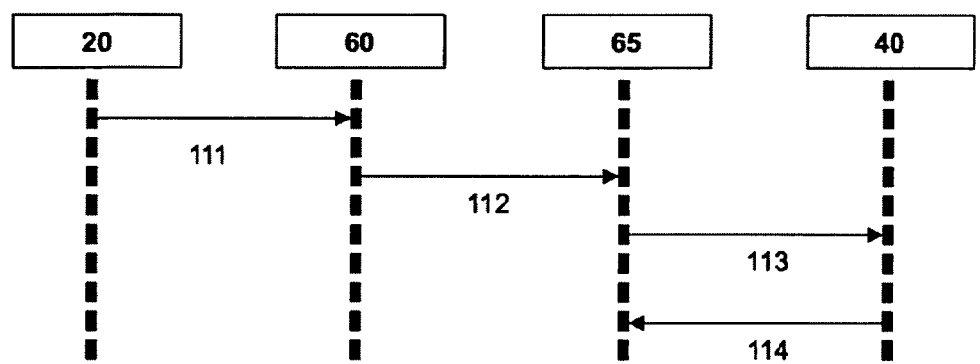
FIG. 4 illustrates schematically a communication diagram related to the initialization process for initializing an access node out of a plurality of access nodes of the telecommunications network in such a way that communication access and especially Internet Protocol connectivity of a CPE to the telecommunications network can be provided via the access node.

In FIG. 4, a communication diagram is shown which is related to the initialization process for effectively initializing an access node 20 out of a plurality of access nodes 20 of the telecommunications network 5 in such a way that communication access and especially Internet Protocol connectivity of a CPE 10 (and preferably a plurality of for example 10 or 100 or 1000 or 10000 CPEs 10) to the telecommunications network 5 can be provided via the access node 20. The communication diagram represents a multitude of different messages exchanged between the access node 20, the control function 40, the operation support system 60 and the network IDP 65.

In the case of initially setting up a telecommunications network to enable the Internet Protocol connectivity to one of the plurality of CPEs 10 connected to the access node 20 to be initialized, the access node 20 is connected (in an eleventh step) to the operation support system 60 by means of a management communication channel. The management communication channel is, e.g., realized by means of using a management address such as an Internet Protocol management address. For each physical communication channel (to possibly a CPE 10 or another device) that the access node 20 (which is to be initialized by such a management communication channel) is able to provide, the access node 20 is able to transmit to the operation support system 60 the following pieces of information: the line ID, the port ID, the status of the physical communication channel, as well as further network parameters such as the maximum bandwidth physically possible. This is represented by an eleventh message 111. Based on the information received by the access node 20 with respect to a specific physical communication channel, the operation support system 60 is able to get the port ID or configure the port ID from/to a port of an access node, configure the line ID to a port represented by the port ID, configure physical limits of the available bandwidth as well as other parameters. Furthermore, the operation support system 60 is able to store the location information (related to the physical communication channel) related to the line ID. In case no line ID is available, the operation support system 60 can provide a configuration such that the line ID is equal to the port ID. Alternatively to realizing the configuration such that in case of an unavailable line ID the port ID and the line ID are set to be equal, it is also possible to not specify the line ID. In such a case, if the control function 40 receives a request regarding a physical communication channel (or network port) having no specified line ID or an unknown line ID, the control function does not reject such a request but grants network access in a limited fashion, e.g. according to a configuration and installation functionality level or a fault policy, i.e. only permitting a maintenance functionality (i.e. a functionality level even more reduced than the functionality level previously referred to providing a basic connectivity (with no relationship to a contract and to enable to use customer self care capabilities)—called "first functionality level").

The process of initializing the access node 20 means that the operation support system 60 detects (or discovers) the technical status as well as the logical status of each network port (or physical communication channel) of the access node 20, or that the operation support system 60 detects (or discovers) the technical status as well as the logical status of at least the majority of the network ports (or physical communication channels) of the access node 20. As this initializing process of the access node 20 can be performed automatically, this process is also called autodiscovery of the access node 20 or autodiscovery of the network ports of the access node 20.

According to the present invention, it is preferred that the operation support system 60 knows at least the following possibilities regarding the technical status of a network port (or physical communication channel):
- network port is available ("OK"), i.e. there is no error detected associated with the physical communication channel or network port;
- network port is not available ("not OK"), i.e. there is an error detected associated with the physical communication channel or network port;
- network port is busy ("Sync"), i.e. there is a connection established between the network port of the access node 20 and, e.g., a CPE 10.

According to the present invention, it is preferred that the operation support system 60 knows at least the following possibilities regarding the logical status of a network port (or physical communication channel):
- network port is provisioned ("Provisioned"), i.e. the information regarding the port ID, the location and the line ID are present at the operation support system 60;
- network port is not provisioned ("unprovisioned"), i.e. the information regarding the port ID is present at the operation support system 60 but not the information regarding the line ID (according to one embodiment of the present invention but not necessarily, this results in setting the line ID equal to the port ID).

In a twelfth step, the operation support system 60 transmits the line ID information, the location information as well as the information regarding the technical and logical status of the different network ports of the initialized access node 20 to the network IDP 65. This is represented by a twelfth message 112.

In a thirteenth step, a message is sent to the control function 40 requesting the generation of a (new) network port entry in a memory unit of the control function 40 or assigned to the control function 40. The new network port entry represents the network port newly discovered by the telecommunications network 5 or newly integrated in the management of the telecommunications network 5 by means of the initialization process of the access node 20. The thirteenth step is represented by a thirteenth message 113. The thirteenth message 113 is preferably sent by the network IDP 65. In an optional fourteenth step, the control function 40 acknowledges the generation of the network port entry. This is represented by a fourteenth message 114.

As a result, the access node 20 is configured or initialized to use a newly discovered network port, i.e. allowing a new physical communication channel between the access node 20 and a CPE 10. The operation support system 60 knows the technical and logical status of the network ports of the access node 20 as well as line ID, port ID, location and further network parameter. The network IDP 65 knows the technical and logical status of all the network ports at the newly initialized and configured access node 20 as well as the line ID and location related to the line ID; furthermore, the network IDP 65 has detected which one of the network ports is potentially federable (i.e. can be federated) and which one of the network ports is already federated. The control function 40 knows about all line IDs (and network ports) of the network IDP 65 together with the corresponding authorization information for the Internet Protocol ranges addressable by the CPE 10 as well as other filters (e.g. Layer4) and the possible bandwidth. According to the present invention, it is always possible to provide an IP-connectivity. In case that only a port ID is available, such IP-connectivity is only available for internal uses (of the telecommunications network). In case that additionally a line ID is available, IP-connectivity is also available according to a default policy (first functionality level), providing access to a walled garden, from a CPE 10 linked to the access node 20.

Figure 5:
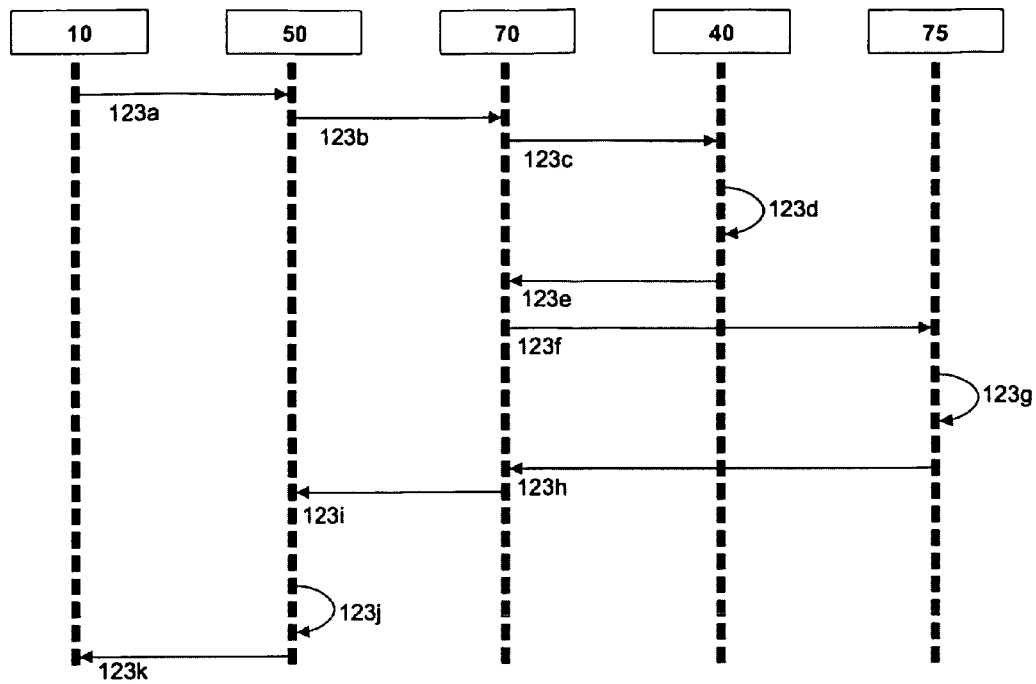
FIGS. 5 to 8 illustrate schematically communication diagrams related to the authentication process.
Figure 6:
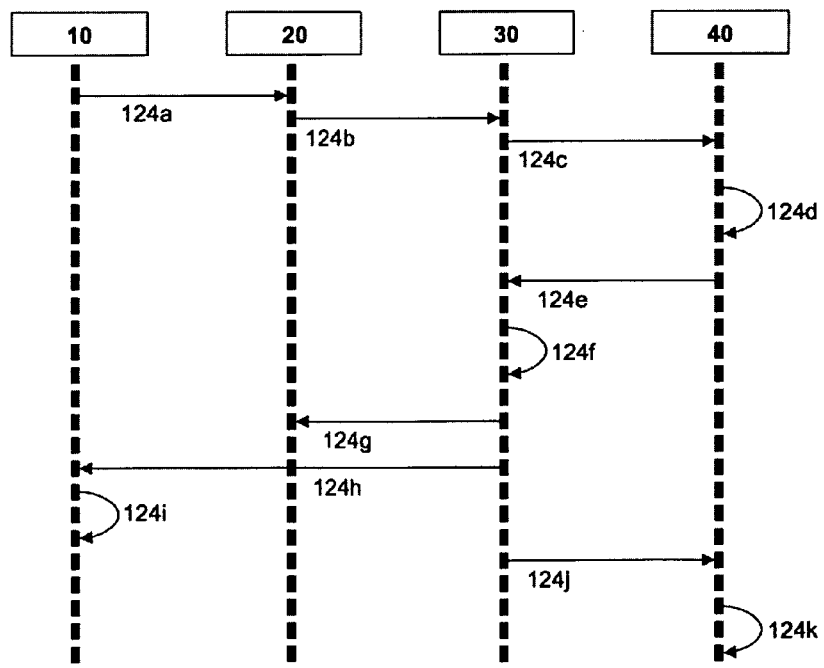
Figure 7:
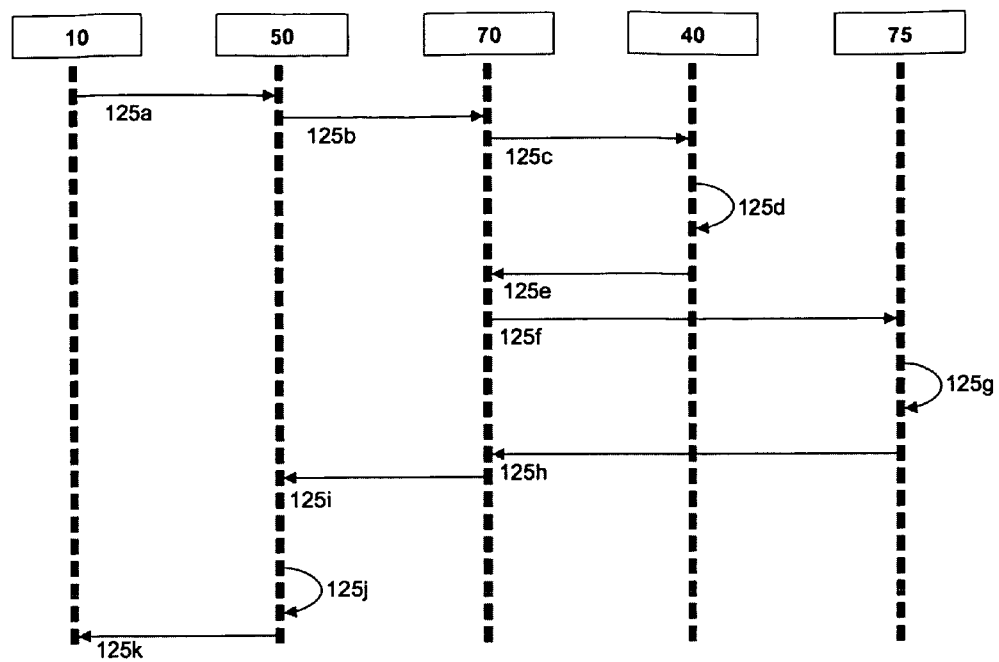
Figure 8:
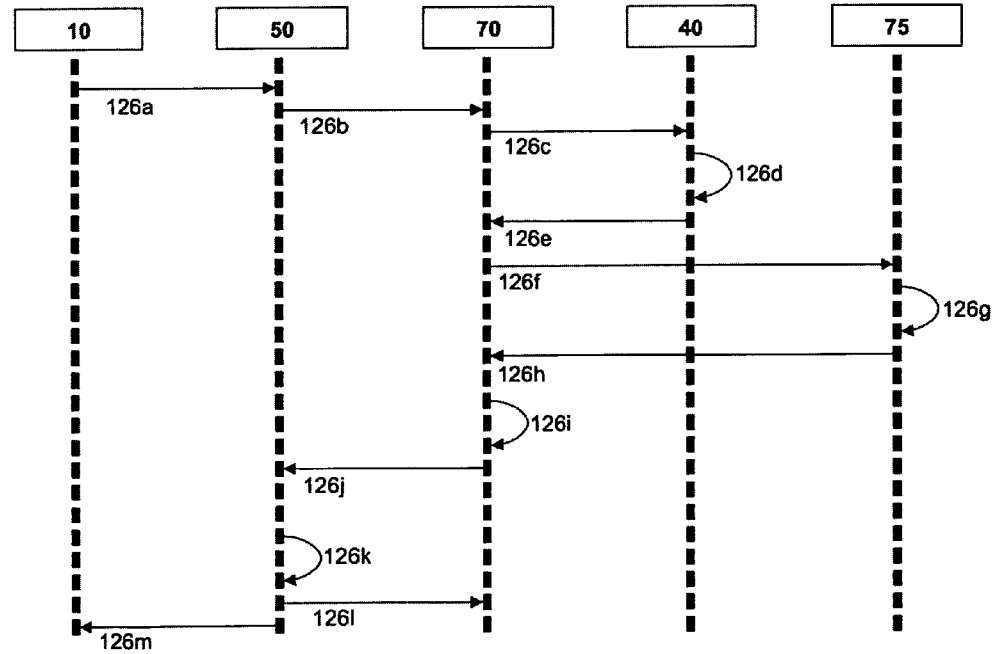

In FIGS. 5 to 8, communication diagrams related to the authentication process are schematically represented. With respect to the description of FIG. 5, a first to an eleventh step and corresponding first to eleventh messages or processings 123*a* to 123*k* are mentioned which only refer to the description of FIG. 5. With respect to the description of FIG. 6, a first to an eleventh step and corresponding first to eleventh messages or processings 124a to 124k are mentioned which only refer to the description of FIG. 6. With respect to the description of FIG. 7, a first to an eleventh step and corresponding first to eleventh messages or processings 125a to 125k are mentioned which only refer to the description of FIG. 7. With respect to the description of FIG. 8, a first to a thirteenth step and corresponding first to thirteenth messages or processings 126a to 126m are mentioned which only refer to the description of FIG. 8. In FIG. 5, a first alternative embodiment of an authentication process is represented. In FIGS. 6 and 7, a second alternative embodiment of an authentication process is represented. In FIG. 8, a third alternative embodiment of an authentication process is represented.

In FIG. 5, the communication diagram related to the first embodiment of the authentication process is schematically illustrated by means of a multitude of different messages exchanged between the CPE 10, the application 50, the A&A function 70, the control function 40, and the application IDP 75. A&A function 70 as well as the application IDP 75 could be partially or fully realized by a Home Subscriber Server (HSS) component. The application 50 is realized in the context of the first embodiment of the authentication process of the present invention by means of a SIP proxy 50. In the following SIP REGISTER means the sequence starting with the initial request of a CPE towards the Internet Protocol Multimedia Subsystem (IMS) of the telecommunications network 5 and ending with a SIP session. The authentication according to the first embodiment is NASS based, i.e. it uses the Network Attachment Subsystem of the telecommunications network 5 for authenticating an application session, especially a SIP (Session Initiation Protocol) connection. According to the first embodiment regarding the authentication process, it is possible that the telephone numbers associated to POTS-ports of the CPE 10 (i.e. ports or interfaces or functionality of the CPE 10 that provide the functionality of the legacy POTS (Plain Old Telephone System) system) can be automatically retrieved or determined. The CPE 10 transmits a SIP-REGISTER request comprising the e.g. SIP-From-Header and uses, e.g., for the first POTS-port the local part address <local part1>, for the second POTS-port the local part address <local part2>, etc. In the telecommunications network 5, preferably in the application IDP 75, a service profile for each local part address is stored related to the user ID. The service profile is provided, e.g., in the form of a table relating the <local part1> address to a specific telephone number, such as +49 6001 12345678 (optionally also a plurality of such telephone numbers), and relating the <local part2> address to another specific telephone number, such as +49 6001 23456789 (optionally also a plurality of such telephone numbers). It is preferred according to the present invention that a SIP-proxy (P-CSCF) 50 exists in the Internet Protocol Multimedia Subsystem (IMS) of the telecommunications network 5, the SIP-proxy 50 being able to determine the user ID together with a VoIP-Profile through a communication with the A&A function 70 and the control function 40. By using (providing) the line ID (network access related identification information), the A&A function 70 is able to determine or retrieve the user or user ID associated with the line ID, and thereafter the A&A function 70 is able to request or retrieve from the application IDP 75 which telephone number is configured to the local part of the service profile related to the user ID. Then, the SIP proxy 50 can communicate a SIP REGISTER procedure with the data obtained from the other entities of the telecommunications network 5. In more detail, this process is hereinafter described and represented in FIG. 5. In a first step, involving a first message 123a comprising preferably the Internet Protocol address and a <local part1>@<fqdn> information (for its first POTS-port), the CPE 10 requests a SIP REGISTER at the SIP proxy of the Internet Protocol Multimedia Subsystem 50. In a second step, involving a second message 123b comprising preferably the Internet Protocol address and the <local part1>@<fqdn> information, the SIP proxy 50 extracts the local part of the SIP user name and requests the user ID, the telephone number as well as the authorization (related to the Internet Protocol address) from the A&A function 70. In a third step, involving a third message 123c, the A&A function 70 requests the corresponding line ID or a (opaque) handle to the line ID (related to the Internet Protocol address) from the control function 40. In a fourth step, involving a processing 123d, the control function 40 determines the line ID (or a handle for the line ID) related to the IP connectivity. In a fifth step, involving a fifth message 123e, the control function 40 transmits the line ID or the handle thereto to the A&A function 70. In a sixth step, involving a sixth message 123f, the A&A function 70 requests from the application IDP 75 the user ID as well as the telephone number stored at the user ID's profile for <local part1> and the authorization related to the user ID. In a seventh step, involving a processing 123g, the application IDP 75 determines the requested information, and in an eighth step, involving an eighth message 123h, the application IDP returns the requested information to the A&A function 70. In a ninth step, involving a ninth message 123i, the A&A function 70 returns the requested information (i.e. the user ID, the line ID, phone number and authorization information related to the Internet Protocol address) to the SIP proxy 50 of the Internet Protocol Multimedia Subsystem (IMS). In a tenth step, involving a processing 123j, the SIP proxy 50 verifies the authorization information and prepares a SIP REGISTER (in case the authorization is positive) and an acknowledgment to the requesting CPE 10. In an eleventh step, involving an eleventh message 123k, the SIP proxy 50 proceeds (in case the authorization is positive) with a SIP REGISTER of the requesting CPE 10 with the determined POTS telephone number related to the POTS port identified by the local part information.

As a result, the SIP-REGISTER procedure has been executed involving a NASS based authentication of the CPE 10 with the telephone number being associated to the profile for <local part1> of the user ID memorized in the application IDP 75 which is in relation to the line ID after a federation of line ID and user ID. A SIP REGISTER has been performed without any personalized credentials required to be stored within the CPE 10 but with the possibility to assign individual telephone numbers to different POTS ports of a CPE. This procedure of a NASS based authentication can also be applied in relation to other applications. In this case other profile related information like <local part1> could be used to retrieve information from the application IDP 75 to avoid service specific information stored within the CPE.

In FIGS. 6 and 7, the communication diagram related to the second embodiment of the authentication process is schematically illustrated by means of a multitude of different messages exchanged between:

in FIG. 6: the CPE 10, the access node 20, the Internet Protocol Edge node 30, and the control function 40, and in FIG. 7: the CPE 10, the application 50, the A&A function 70, the control function 40, and the application IDP 75.

The authentication according to the second embodiment is also NASS based. According to the second embodiment regarding the authentication process, the control function 40 is able to provide (with regard to a valid access request) either a token information or a link (Uniform Resource Identifier (URI)) to a token information to the Internet Protocol Edge node 30. Optionally thereto, it is possible according to the second embodiment of the authentication process that a token server that provides the token information and/or the link to the token information to the control function 40. The token information and/or the link (Uniform Resource Identifier (URI)) of the token information can be transmitted to the CPE 10 by means of, e.g., a DHCP protocol and/or a PPPoE protocol. In case the CPE 10 receives a link to a token information (such as a Uniform Resource Identifier (URI)), the CPE 10 is able to request or to retrieve the token information at the token server. Preferably, the CPE 10 can store the token information at a secure location. In more detail, a first part of the authentication process according to the second embodiment is hereinafter described and represented in FIG. 6.

In a first step, involving a first message 124*a*, the CPE 10 requests an Internet Protocol address form the access node 20. In a second step, involving a second message 124*b* comprising preferably further information such as the line ID, the port ID and further network parameters, the request for an IP address is transferred from the access node 20 to the Internet Protocol Edge node 30. In a third step, involving a third message 124*c*, the Internet Protocol Edge node 30 requests an authorization (for the Internet Protocol address) at the control function 40 (transmitting the Line ID and the port ID). In a fourth step, involving a processing 124*d*, the control function 40 determines the authorization information related to the line ID (regarding addressable IP ranges, authorized bandwidths (for uplink and downlink), and the like. Furthermore, the control function 40 generates or retrieves a token information. In a fifth step, involving a fifth message 124*e*, the control function 40 transmits the Internet Protocol address, the authorization and the token information (or the Uniform Resource Identifier (URI) to the token information) to the Internet Protocol Edge node 30. In a sixth step, involving a processing 124*f*, the Internet Protocol Edge node 30 parameterizes the IP connection for the CPE 10, i.e. ranges of Internet Protocol address that should be accessible to the CPE 10 including accessibility to multicast, and bandwidth information regarding allowed or authorized bandwidths (e.g. regarding the upload bandwidth and/or regarding the download bandwidth). If necessary, the Internet Protocol Edge node 30 transmits in a seventh step, involving a seventh message 124*g*, a configuration information to the access node 20, e.g. in case that the multicast configuration profile at the access node 20 has to be changed. In an eighth step, involving an eighth message 124*h*, the Internet Protocol Edge node 30 transmits to the CPE 10 all the relevant information for starting an IP connection, including the token information or the Uniform Resource Identifier (URI) to the token information, the network information such as the default gateway, the DNS address. In a ninth step, involving a processing 124*i*, the CPE 10 (optionally retrieving the token by using the Uniform Resource Identifier (URI)) stores the token information. In a tenth step, involving a tenth message 124*j*, the Internet Protocol Edge node 30 sends an accounting start request (with the line ID, port ID, the Internet Protocol address, the network parameters, and the token information) to the control function 40. In an eleventh step, involving a processing 124*k*, the control function generates the session with the network parameters and the token information.

A second part of the authentication process according to the second embodiment is hereinafter described and represented in FIG. 7. In a twelfth step, involving a twelfth message 125*a* comprising preferably the Internet Protocol address and a <local part1#token>@<fqdn> information (for its first POTS-port), the CPE 10 requests a SIP REGISTER at the SIP proxy 50 of the Internet Protocol Multimedia Subsystem (IMS). In a thirteenth step, involving a thirteenth message 125*b* comprising preferably the Internet Protocol address and the <local part1#token> information, the SIP proxy 50 requests the user ID, the telephone number as well as the authorization (related to the Internet Protocol address) from the A&A function 70. In a fourteenth step, involving a fourteenth message 125*c*, the A&A function 70 requests the corresponding line ID or a (opaque) handle to the line ID (related to the Internet Protocol address) and a token information from the control function 40. In a fifteenth step, involving a processing 125*d*, the control function 40 determines the line ID (or additionally generates a handle for the line ID) as well as the token information (or retrieves the token information or a link thereto) related to the IP connectivity. In a fifth step, involving a sixteenth message 125*e*, the control function 40 transmits the token information (or link information thereto) and the line ID (or the handle thereto) to the A&A function 70. In a seventeenth step, involving a seventeenth message 125*f*, and in case of corresponding (e.g. identical) token information from the control function 40 on the one hand and the <local part1#token> information provided by the SIP proxy 50 on the other hand as a prerequisite for a positive authentication, the A&A function 70 requests from the application IDP 75 the user ID as well as the telephone number stored at the user ID's profile for <local part1> and the authorization related to the user ID. In an eighteenth step, involving a processing 125*g*, the application IDP 75 determines the requested information, and in an nineteenth step, involving a nineteenth message 125*h*, the application IDP 75 returns the requested information to the A&A function 70. In a twentieth step, involving a twentieth message 125*i*, the A&A function 70 returns the requested information to the SIP proxy 50 of the Internet Protocol Multimedia Subsystem (IMS) of the telecommunications network 5. In a twenty-first step, involving a processing 125*j*, the SIP proxy 50 verifies the authorization information and prepares a SIP register (in case the authorization is positive) and an acknowledgment to the requesting CPE 10. In a twenty-second step, involving a twenty-second message 125*k*, the SIP proxy 50 proceeds (in case the authorization is positive) with a SIP REGISTER of the requesting CPE 10, thereby transmitting the determined POTS telephone number related to the POTS port identified by the local part information.

As a result, the CPE 10 has all necessary information related to access the authorized services of the telecommunications network 5. The IP-Connectivity is possible without credential information stored in the CPE 10 prior to the network connection of the CPE 10 with the telecommunications network 5. The Internet Protocol Edge node 30 comprises the necessary configuration information, e.g. addressable IP ranges for the IP connection between the Internet Protocol Edge Node 30 and the CPE. The access node 20 has received the relevant multicast configuration information, directly or indirectly from the Internet Protocol Edge node 30. The control function 40 comprises a session instance comprising the IP address used by the CPE, the addressable IP ranges, port ID, line ID, network parameter as well as a token information (or a link thereto). The SIP-REGISTER procedure has been executed involving a NASS based authentication of the CPE 10 with the telephone number being associated to the profile for <local part1> of the user ID memorized in the application IDP 75 which is in relation to the line ID after a federation of line ID and user ID. A SIP REGISTER has been performed without any personalized credentials required to be stored within the CPE 10 but with the possibility to assign individual telephone numbers to different POTS ports of a CPE. The authentication has been performed in a securitized manner, namely securitized by the token information: only the CPE (home gateway) can proceed to the SIP REGISTER but not another client that is possibly present in the local network. This procedure of a NASS based authentication secured with a token can also be applied in relation to other applications. In this case other profile related information like <local part1> could be used to retrieve information from the application IDP 75 to avoid service specific information stored within the CPE.

The method according to the second embodiment of the authentication process can also be modified to transport the local part information and the token information in different header fields of a SIP register or another communication method.

The method according to the second embodiment of the authentication process can also be extended to other terminal devices in the home network (of the CPE 10). In case that another device within the home network sends a DHCP-request to the CPE 10 and the MAC address of the other device is known to the CPE 10, it is possible to request another token information for the other device. In this case, the request of the CPE 10 (towards the telecommunications network 5) has to comprise the token information previously received by the control function 40 and the control function 40 (or a token server) can verify whether the CPE 10 is allowed to receive another token information (for the other device in the home network). After these steps have been performed, the other device in the home network (other than the CPE 10) can also secure a SIP REQUEST by means of the token information. This procedure of a NASS based authentication secured with a token can also be applied in relation to other applications. In this case other profile related information like <local part1> could be used to retrieve information from the application IDP 75 to avoid service specific information stored within the CPE.

In FIG. 8, the communication diagram related to the third embodiment of the authentication process is schematically illustrated by means of a multitude of different messages exchanged between the CPE 10, the application 50, the A&A function 70, the control function 40, and the application IDP 75. The authentication according to the third embodiment is also NASS based. According to the third embodiment regarding the authentication process, it is possible that the session is hold at the A&A function 70. The CPE 10 transmits a request to the application 50 (e.g. via a browser program) at a time when the CPE 10 using an application like a browser is not yet known (or authorized) by the application 50. In more detail, this process is hereinafter described and represented in FIG. 8. In a first step, involving a first message 126a, the CPE 10 requests a service (e.g. to be connected) at the application 50. In a second step, involving a second message 126b, the request is transferred to the A&A function 70 together with a transaction identification information (hereinafter also called transaction ID). This corresponds to a login at a single sign on service (e.g. based on SAML (Security Assertion Markup Language)). In a third step, involving a third message 126c, the A&A function 70 requests the corresponding line ID or a (opaque) handle to the line ID (related to the Internet Protocol address) from the control function 40. In a fourth step, involving a processing 126d, the control function 40 determines the line ID (or handle for the line ID) related to the IP connectivity. In a fifth step, involving a fifth message 126e, the control function 40 transmits the line ID or the handle thereto to the A&A function 70. In a sixth step, involving a sixth message 126f, the A&A function 70 requests from the application IDP 75 the user ID as well as the authorization related to the line ID. In a seventh step, involving a processing 126g, the application IDP 75 determines the requested information, and in an eighth step, involving an eighth message 126h, the application IDP returns the requested information to the A&A function 70. In a ninth step, involving a processing 126i, the A&A function 70 starts a single sign-on session (SSO session) related to the user ID. In a tenth step, involving a tenth message 126j, the A&A function 70 returns the requested information to the application 50 by means of a redirect message comprising the user ID and the authorization related to the user ID or a reference information, the application can retrieve the requested information. In an eleventh step, involving a processing 126k, the application 50 starts a session. In a twelfth step, involving an twelfth message 126l, the application 50 optionally transmits the start of the session to the A&A function 70. In a thirteenth step, involving an thirteenth message 126m, the application 50 transmits a message to the CPE 10 according to which the requested authorization is granted.

As a result, the CPE 10 or application on the CPE is authorized to use the requested service from the application 50. The A&A function 70 has started optionally a SSO session. The application 50 has started a session that is optionally known to the A&A function 70. The Internet Protocol address used to authenticate the CPE 10 is related by the A&A function 70 both optionally with regard to the SSO session as well as to the session in the application 50.

This procedure of a NASS based authentication may also optionally secured with a token.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LEGEND FOR REFERENCE CHARACTERS 5 telecommunications network
10 customer premises equipment (CPE)
11 configuration device
20 access node
30 Internet Protocol Edge node
40 control function
50 application function or application entity
60 operation support system
65 network identity provider (IDP)
70 authorization and authentication function (A&A function)
75 application identity provider (DP)
80 Customer Relation Management function
85 customer self care portal 101-107 messages
111-114 messages
123a-123k messages or processings
124a-124k messages or processings
125a-125k messages or processings
126a-126m messages or processings

The invention claimed is:

1. A method for efficiently establishing or configuring a connection between a telecommunications network and a customer premises equipment (CPE) via an access node, the method comprising the steps of:
    establishing a physical communication channel between the access node of the telecommunications network and the CPE, the physical communication channel being assigned to a network access-related identification information related to the access node;
    providing, by the telecommunications network, a public or private Internet Protocol (IP) address to the CPE for use by the CPE to communicate with an IP Edge node of the telecommunications network, the IP address being associated with the network access-related identification information and an IP session or connection realizing a logical communication channel being initiated between the IP Edge node of the telecommunications network and the CPE, wherein the IP Edge node is a routing device having a plurality of access and permission rules regarding different IP addresses on different virtual interfaces, wherein the logical communication channel corresponds to the IP session or connection;
    initially assigning, by the telecommunications network, a first functionality level to the public or private IP address; and
    assigning, by the telecommunications network, a second functionality level to the public or private IP address, when the telecommunications network is able to relate the network access-related identification information to a contract-related identification information, wherein the network access-related identification information is a port ID information and/or a line ID information and wherein the contract-related identification information corresponds to a user, and wherein relating the network access-related identification information to the contract-related identification information comprises an authentication based on a Network Attachment Subsystem (NASS) of an Internet Multimedia Subsystem (IMS) of the telecommunications network, wherein the authentication uses the NASS of the telecommunications network for authenticating an application session.

2. The method according to claim 1, wherein the logical communication channel is established by using at least one piece of authentication information, the at least one piece of authentication information being a trusted information existing within the telecommunications network.

3. The method according to claim 1, wherein the authentication based on a NASS comprises a Session Initiation Protocol (SIP) registration.

4. The method according to claim 1, wherein the telecommunications network comprises the IP Edge node and a control function, wherein the control function is realized by a centralized authentication, authorization and accounting (AAA) function or an associated AAA node, and wherein the contract-related identification information to enable the second functionality level is sent to the control function after relating the network access-related identification information to the contract-related identification information.

5. The method according to claim 1, wherein a token or a Uniform Resource Identifier (URI) linked to the token is used during the authentication.

6. The method according to claim 1, Wherein the IP Edge node controls the communication between the CPE and the IP Edge node via the access node of the telecommunications network according to the first or second functionality level, wherein the IP Edge node controls which IP addresses and functions are accessible by the CPE on Layer 3 and Layer 4 of the OSI-Model, and wherein based on information received from the control function, the functionality level associated with the network access-related identification information is changed.

7. A telecommunications network provided for efficient establishment or configuration of a connection between the telecommunications network and a customer premises equipment (CPE) via an access node, the telecommunications network comprising:
    a plurality of network nodes; and
    a physical communication channel between the access node of the telecommunications network and the CPE, the physical communication link being associated to a network access-related identification information related to the access node;
    wherein the telecommunications network is configured to provide a public or private Internet Protocol (IP) address to the CPE for use by the CPE to communicate with an IP Edge node of the telecommunications network, the IP address being associated with the network access-related identification information and an IP session or connection realizing a logical communication channel being initiated between the IP Edge node and the CPE), wherein the IP Edge node is a routing device having a plurality of access and permission rules regarding different IP addresses on different virtual interfaces, wherein the logical communication channel corresponds to the IP session or connection;
    wherein the telecommunications network is configured to initially assign a first functionality level to the public or private IP address; and
    wherein the telecommunications network is configured to assign a second functionality level to the public or private IP address when the telecommunications network is able to relate the network access-related identification information to a contract-related identification information, wherein relating the network access-related identification information to the contract-related identification information comprises an authentication based on a Network Attachment Subsystem (NASS) of an Internet Multimedia Subsystem (IMS) of the telecommunications network, wherein the authentication uses the NASS of the telecommunications network for authenticating an application session.

8. The telecommunications network according to claim 7, wherein the logical communication channel is established by using at least one piece of authentication information, the at least one piece of authentication information being a trusted information existing within the telecommunications network.

9. The telecommunications network according to claim 7, wherein the telecommunications network comprises an IP Edge node and a control function, wherein the control function is realized by a centralized authentication, authorization and accounting (AAA) function or an associated AAA node, and wherein the telecommunications network is configured such that the contract-related identification information to enable the second functionality level is sent to the control function after relating the network access-related identification information to the contract-related identification information.

10. The telecommunications network according to claim 7, wherein the contract-related identification information is a user ID, wherein the IMS of the telecommunications network is configured to retrieve or determine a service profile automatically, wherein the service profile is associated with a local part address of a port of the CPE, Wherein in the telecommunications network the service profile is stored as being related to the user ID.

11. A non-transitory computer readable medium having computer-executable instructions stored thereon for controlling an access node or a control function of a telecommunications network, the computer-executable instructions, when executed by a processor, causing the following steps to be performed:
   establishing a physical communication channel between the access node of the telecommunications network and a customer premises equipment (CPE), the physical communication channel being assigned to a network access-related identification information related to the access node;
   providing, by the telecommunications network, a public or private Internet Protocol (IP) address to the CPE for use by the CPE to communicate with an IP Edge node of the telecommunications network, the IP address being associated with the network access-related identification information and an IP session or connection realizing a logical communication channel being initiated between the IP Edge node of the telecommunications network and the CPE, wherein the IP Edge node is a routing device having a plurality of access and permission rules regarding different IP addresses on different virtual interfaces, wherein the logical communication channel corresponds to the IP session or connection;
   initially assigning, by the telecommunications network, a first functionality level to the public or private IP address; and
   assigning, by the telecommunications network, a second functionality level to the public or private IP address, when the telecommunications network is able to relate the network access-related identification information to a contract-related identification information, wherein the network access-related identification information is a port ID information and/or a line ID information and wherein the contract-related identification information corresponds to a user, and wherein relating the network access-related identification information to the contract-related identification information comprising an authentication based on a Network Attachment Subsystem (NASS) of an Internet Multimedia Subsystem (IMS) of the telecommunications network, wherein the authentication uses the NASS of the telecommunications network for authenticating an application session.

* * * * *